(12) United States Patent
Nassor et al.

(10) Patent No.: US 9,009,344 B2
(45) Date of Patent: Apr. 14, 2015

(54) METHOD OF SENDING DATA AND ASSOCIATED DEVICE

(75) Inventors: Eric Nassor, Thorigne Fouillard (FR); Frédéric Maze, Langan (FR)

(73) Assignee: Canon Kabushiki Kaisha, Tokyo (JP)

( * ) Notice: Subject to any disclaimer, the term of this patent is extended or adjusted under 35 U.S.C. 154(b) by 347 days.

(21) Appl. No.: 12/793,650

(22) Filed: Jun. 3, 2010

(65) Prior Publication Data

US 2010/0318675 A1    Dec. 16, 2010

(30) Foreign Application Priority Data

Jun. 16, 2009 (FR) ..................................... 09 54033

(51) Int. Cl.
*H04L 29/06* (2006.01)
*H04L 12/801* (2013.01)
(Continued)

(52) U.S. Cl.
CPC .............. *H04L 65/80* (2013.01); *G06F 15/173* (2013.01); *H04N 7/18* (2013.01); *G06F 15/16* (2013.01); *H04L 47/10* (2013.01); *H04L 47/12* (2013.01); *H04L 47/14* (2013.01); *H04L 47/19* (2013.01);
(Continued)

(58) Field of Classification Search
CPC ....... H04N 21/238; H04N 7/26; H04N 19/00; H04N 7/18; H04L 47/38; G06F 15/173
USPC ................... 709/235, 233, 247, 234
See application file for complete search history.

(56) References Cited

U.S. PATENT DOCUMENTS

| 3,566,090 A | * | 2/1971 | Johnson .......................... 377/26 |
| 5,295,135 A | * | 3/1994 | Kammerl ....................... 370/233 |

(Continued)

FOREIGN PATENT DOCUMENTS

| FR | 2922391 | 4/2009 | ................ H04L 1/20 |
| FR | 2923118 A1 | 5/2009 | .............. H04L 29/06 |

OTHER PUBLICATIONS

Tsaoussidis et al., "TCP-Real: receiver-oriented congestion control", 2002.*

(Continued)

*Primary Examiner* — O. C. Vostal
(74) *Attorney, Agent, or Firm* — Fitzpatrick, Cella, Harper & Scinto

(57) ABSTRACT

A method of sending a data stream of video images between a server and at least one client device in a communication network, employing a rate setting for the sending of data over the communication network, the method comprising the following steps:

obtaining (910) an item of information $P_c$ representing a speed of variation over time for a rate setting, said item of information depending on at least one characteristic of the state of the traffic over the communication network, comparing (920) said item of information $P_c$ so obtained with a scheduled time $E_v$ for a set of video image data to send, adapting (930) the rate setting delivered by the server on the basis of at least the result of the comparing step, compressing said set of video image data to send using a compression mode which depends on the adapted rate setting, sending said set of video image data so compressed.

11 Claims, 9 Drawing Sheets

(51) Int. Cl.
*H04L 12/807* (2013.01)
*H04L 12/841* (2013.01)
*H04L 12/811* (2013.01)
*G06F 15/173* (2006.01)
*H04N 7/18* (2006.01)
*G06F 15/16* (2006.01)

(52) U.S. Cl.
CPC .............. *H04L 47/27* (2013.01); *H04L 47/283* (2013.01); *H04L 47/38* (2013.01)

(56) References Cited

U.S. PATENT DOCUMENTS

| | | | |
|---|---|---|---|
| 5,426,640 A * | 6/1995 | Hluchyj et al. | 370/235 |
| 5,864,678 A * | 1/1999 | Riddle | 709/235 |
| 5,913,013 A * | 6/1999 | Abecassis | 386/261 |
| 5,968,128 A * | 10/1999 | Lauck et al. | 709/232 |
| 6,009,108 A * | 12/1999 | Takehara et al. | 370/538 |
| 6,141,053 A * | 10/2000 | Saukkonen | 375/240.01 |
| 6,233,226 B1 * | 5/2001 | Gringeri et al. | 370/252 |
| 6,404,928 B1 * | 6/2002 | Shaw et al. | 382/232 |
| 6,665,872 B1 * | 12/2003 | Krishnamurthy et al. | 725/95 |
| 6,751,673 B2 * | 6/2004 | Shaw | 709/231 |
| 6,754,210 B1 * | 6/2004 | Ofek | 370/389 |
| 6,868,062 B1 * | 3/2005 | Yadav et al. | 370/234 |
| 7,099,954 B2 * | 8/2006 | Li et al. | 709/233 |
| 7,292,164 B1 * | 11/2007 | Wegener | 341/76 |
| 7,394,762 B2 * | 7/2008 | Leith et al. | 370/229 |
| 7,536,469 B2 * | 5/2009 | Chou et al. | 709/231 |
| 7,649,484 B1 * | 1/2010 | Wegener | 341/155 |
| 7,657,672 B2 * | 2/2010 | Kampmann et al. | 710/52 |
| 7,721,314 B2 * | 5/2010 | Sincaglia et al. | 725/96 |
| 7,733,777 B1 * | 6/2010 | Sridharan et al. | 370/231 |
| 7,760,641 B2 * | 7/2010 | Gilfix | 370/235 |
| 7,782,774 B2 * | 8/2010 | Cheriton | 370/232 |
| 7,784,076 B2 * | 8/2010 | Demircin et al. | 725/81 |
| 8,032,369 B2 * | 10/2011 | Manjunath et al. | 704/229 |
| 8,135,061 B1 * | 3/2012 | Ganesan et al. | 375/240.02 |
| 8,155,003 B2 * | 4/2012 | Dong et al. | 370/232 |
| 8,379,851 B2 * | 2/2013 | Mehrotra et al. | 380/200 |
| 8,474,001 B2 * | 6/2013 | Thompson et al. | 725/131 |
| 8,488,447 B2 * | 7/2013 | Bugenhagen et al. | 370/228 |
| 2002/0019990 A1 * | 2/2002 | Sincaglia et al. | 725/142 |
| 2002/0044563 A1 * | 4/2002 | Magill et al. | 370/411 |
| 2002/0163887 A1 * | 11/2002 | Suni | 370/232 |
| 2003/0032391 A1 * | 2/2003 | Schweinhart et al. | 455/12.1 |
| 2003/0135863 A1 * | 7/2003 | Van Der Schaar | 725/95 |
| 2004/0033806 A1 * | 2/2004 | Daniel et al. | 455/450 |
| 2004/0044783 A1 * | 3/2004 | Nordberg | 709/231 |
| 2004/0199659 A1 * | 10/2004 | Ishikawa et al. | 709/235 |
| 2005/0070293 A1 * | 3/2005 | Tsukiji et al. | 455/452.1 |
| 2005/0105815 A1 * | 5/2005 | Zhang et al. | 382/251 |
| 2005/0207442 A1 * | 9/2005 | Zoest et al. | 370/465 |
| 2005/0249226 A1 * | 11/2005 | Kang | 370/412 |
| 2006/0095943 A1 * | 5/2006 | Demircin et al. | 725/81 |
| 2006/0165168 A1 * | 7/2006 | Boyce et al. | 375/240.12 |
| 2006/0193348 A1 * | 8/2006 | Unno et al. | 370/535 |
| 2006/0224762 A1 * | 10/2006 | Tian et al. | 709/231 |
| 2007/0115814 A1 * | 5/2007 | Gerla et al. | 370/230 |
| 2007/0209068 A1 * | 9/2007 | Ansari et al. | 726/13 |
| 2007/0211631 A1 * | 9/2007 | Rahman et al. | 370/230 |
| 2007/0236599 A1 * | 10/2007 | van Beek | 348/419.1 |
| 2008/0052414 A1 * | 2/2008 | Panigrahi et al. | 709/246 |
| 2008/0137685 A1 * | 6/2008 | Gunaseelan et al. | 370/468 |
| 2008/0201140 A1 * | 8/2008 | Wells et al. | 704/231 |
| 2008/0216116 A1 * | 9/2008 | Pekonen et al. | 725/39 |
| 2008/0295175 A1 * | 11/2008 | Ansari et al. | 726/23 |
| 2008/0316936 A1 * | 12/2008 | Enomoto | 370/252 |
| 2009/0113048 A1 | 4/2009 | Maze et al. | 709/224 |
| 2009/0193484 A1 * | 7/2009 | Zhang et al. | 725/112 |
| 2009/0232224 A1 * | 9/2009 | Monaco | 375/240.26 |
| 2009/0245587 A1 * | 10/2009 | Holcomb et al. | 382/108 |
| 2009/0249222 A1 * | 10/2009 | Schmidt et al. | 715/751 |
| 2009/0254657 A1 * | 10/2009 | Melnyk et al. | 709/224 |
| 2009/0287839 A1 * | 11/2009 | Fallon et al. | 709/231 |
| 2009/0307368 A1 * | 12/2009 | Sriram et al. | 709/231 |
| 2010/0056131 A1 * | 3/2010 | Kelif | 455/422.1 |
| 2010/0118114 A1 * | 5/2010 | Hosseini et al. | 348/14.09 |
| 2010/0142376 A1 * | 6/2010 | Lou et al. | 370/236 |
| 2010/0192175 A1 * | 7/2010 | Bachet et al. | 725/31 |
| 2010/0202509 A1 * | 8/2010 | Thompson et al. | 375/240.01 |
| 2011/0044293 A1 * | 2/2011 | Nagasawa et al. | 370/332 |
| 2011/0047286 A1 * | 2/2011 | Harrang et al. | 709/233 |

OTHER PUBLICATIONS

Borri et al., "An Experimental Study on Congestion Control in Wireless and Wired Networks", 2005.*
Zhang et al., "Weighted Size-Aware Packet Distribution for Multipath Live Steaming", 2009.*
Handley et al., "TCP Friendly Rate Control (TFRC): Protocol Specification", RFC 3448, 2003.*
Marques et al., "DMIF based QoS Management for MPEG-4 Multimedia Streaming: ATM and RSVP/IP Case Studies".*
Armannsson et al., "Controlling the Effects of Anomalous ARP Behavior on Ethernet Networks", 2005.*
Dan et al., "Comparison of Shaping and Buffering for Video Transmission".*
Kanhere et al., "A Novel Tuneable Low-Intensity Adversarial Attack", 2005.*
Vieron et al., "Real-Time Constrained TCP-Compatible Rate Control for Video Over the Internet", 2004.*
Chen et al., "A New Approach Using Time-Based Model for TCP-Friendly Rate Estimation", 2003.*
Kanakia et al., "An Adaptive Congestion Control Scheme for Real-Time Packet Video Transport", 1993.*
Reininger et al., "Bandwidth Renegotiation for VBR Video Over ATM Networks", 1996.*
Yang et al., "General AIMD Congestion Control", 2000.*
Jin et al., "A Spectrum of TCP-Friendly Window-Based Congestion Control Algorithms", 2003.*
Floyd et al., "Equation-Based Congestion Control for Unicast Applications", 2000.*
Floyd et al.,"TCP Friendly Rate Control (TFRC): Protocol Specification", RFC 5348, 2008.*
Sun et al., "A Performance Comparison of equation-Based and GAIMD Congestion Control in Mobile Ad Hoc Networks", 2008.*
Floyed et al., "A Comparison fo Equation-Based and AIMD Congestion Control", 2000.*
Kesselman et al., "Adaptive AIMD Congestion Control", 2005.*
Floyd, et al., "A Comparison of Equation-Based and AIMD Congestion Control", Technical Report, ACIRI, May 12, 2000, 12 pages. Available at http://www.icir.org/tfrc/aimd.pdf. Submitted document last reviewed Oct. 26, 2009.
Preliminary Search Report in French Patent Application No. 0954033. Dated Oct. 27, 2009.

* cited by examiner

METHOD OF SENDING DATA AND ASSOCIATED DEVICE

The present invention concerns a method for transmitting data and an associated device. The present application claims priority of the French Patent application 0954033, which is incorporated by reference.

In the context of the transmission of multimedia streams (audio and video) by packets over the Internet or over local area networks or LAN, of IP ("Internet Protocol") type, a multimedia data server must send one or more data streams (of video, audio, text or other type) to one or more client devices.

In numerous situations, a client receives and uses up these data progressively with their reception. For example, the client plays the video and the audio progressively as it receives them. This is referred to as "multimedia streaming".

The multimedia streams are then characterized by the fact that they are constituted by data (images, portions of images or "slices", portions of sound or "samples") of which the useful lifetime is limited, that is to say that these data must necessarily be received and processed by the receiving peripheral before a certain scheduled time. This scheduled time corresponds to the time at which the item of data is required to be displayed or played by the client.

Beyond that scheduled time, the data becomes useless and is simply ignored by the client.

For example, to maintain a good level of interactivity and thus a good quality for the users in a video conference application, the scheduled times must typically be less than 120 milliseconds.

Moreover, to obtain rates of sent data compatible with that of the physical network used, the data streams are generally compressed.

Examples of compression standards for video data are the MPEG 2, MPEG 4 part 2 standards, or the H.264 standard, and for audio data, the AMR, G.711, G.722.1 and AAC compression standards.

According to the resolution (size of the images), the quality, and the complexity of the streams to compress, the sizes of the streams may vary between 1 Mbit/s (stream of low resolution and of low quality for a portable telephone) and 100 Mbit/s (stream of high definition of very good quality).

The quality of a compressed multimedia stream depends on several factors.

First of all, the compression methods used are lossy compressions, that is to say that the higher the compression, the more the multimedia data is degraded.

Furthermore, the quality of a video also depends on the speeds of variation in the compression level. The human eye is sensitive to abrupt changes in quality over time, for example from one image to another. To maintain a good quality in a video, it is thus necessary to avoid changing the compression level too rapidly.

Lastly, due to the compression, redundancies are eliminated from the multimedia stream. Any error induced in the stream, for example during the transmission, may thus have consequences over a relatively long time and may thus cause a quality drop that propagates.

Increasing numbers of consumer equipment, such as video cameras, stills cameras, video surveillance cameras, domestic video servers, TV receivers, computers, and telephones, are capable of sending such data streams.

The multimedia streams (video, audio, text) intended to be sent may be stored and compressed in advance on the sending apparatus or on the contrary be captured or received from a first network, immediately compressed and sent on the fly over a communication network to a receiving apparatus.

These multimedia streams are transmitted over communication networks constituted by interconnection nodes (routers, switching devices, etc.) in order to guide and transmit the data packets from the source devices to the recipient devices. They share these communication networks with other data streams (for example Internet browsing, a video game, or the transfer of a file to a printer).

All these data streams are liable to create congestion on the communication networks when they pass via the same network link of insufficient capacity. The excess packets end up being destroyed by the interconnection node situated at the input to the link.

The structure of the network is not known by the sending and receiving devices. More particularly, in the case of portable devices, these latter may be moved and connected to different networks. Each device may also communicate with different devices through the different networks.

Similarly, the streams present do not know each other and their number and their behavior may be very variable over time. The sending device does not know in advance the characteristics of the device which will be used. It must therefore detect and adapt itself dynamically to the current conditions which may vary during communication.

Moreover, the characteristics of the networks are very variable. For example, the round trip communication time may vary between 0.1 ms (case of a local network) and 300 ms (case of an intercontinental communication). Also the rate may vary between 1 Gbit/s (case of a local network) and a few Mbit/s (case of an uploading ADSL Internet access).

Ideally, an item of equipment must detect these different conditions and adapt itself thereto.

Conventionally, the servers and clients use communication protocols implementing congestion control mechanisms in order to avoid continuously losing a high quantity of data in case of congestion and to ensure an equitable use of the network.

These algorithms enable the presence of congestion to be detected on the basis of the packet losses. They act on the sending rate of the data streams in order to reduce or increase it so as to be compatible with the overall bandwidth of the network.

Moreover, in the case of a multimedia transmission with limited scheduled times, it is necessary to adapt the coding rate of the multimedia stream to the current rate available on the network via a coding rate control algorithm.

To be precise, if the multimedia stream is of too large a size, it will not be possible for some packets to be sent in time. A multimedia rate greater than the network rate thus causes losses and therefore a large drop in quality. Equally, too low a multimedia rate also reduces the quality due to the compression. It is thus necessary to adjust the compression to adapt it to the rate available over the network.

The transmission rate calculated by some congestion control algorithms may vary very fast. For example, the AIMD ("Additive Increase Multiplicative Decrease") algorithm which is the classic TCP ("Transmission Control Protocol", one of the basic Internet protocols) algorithm, may abruptly divide the rate by two.

Other algorithms, such as TFRC ("TCP Friendly Rate Control") have also been proposed.

A method is known from the document "Comparison of equation based and AIMD congestion control" by Floyd et al., Technical report ACIRI, available at the address http://www.icir.orq/tfrc/aimd.pdf, which uses an evaluation of the GAIMD congestion control characteristics, in particular the oscillation period of the congestion control. The variability of the congestion control is evaluated, the characteristics of the network are taken into account, and several congestion control parameters are evaluated.

From the document U.S. Pat. No. 7,394,762 B2 a method is also known for modifying the congestion control parameters of GAIMD type, for improving the behavior of a stream in a high bandwidth network, while maintaining compatibility with the TCP streams in low bandwidth networks.

The known congestion control algorithms do not make it possible to have a compression rate which varies always gently, and this leads to a video reproduction of poor quality for the human eye in some cases.

The invention enables this problem to be solved by providing congestion control adapted to the conditions of the network and enabling a good quality to be obtained for the multimedia stream with smoothed variations in compression rate.

For this, a method is provided of sending a data stream of video images between a server and at least one client device in a communication network, employing a rate setting for the sending of data over the communication network, the method comprising the following steps:

obtaining an item of information $P_c$ representing a speed of variation over time for a possible rate setting, said item of information depending on at least one characteristic of the state of the traffic over the communication network, comparing said item of information $P_c$ so obtained with a scheduled time $E_v$ for a set of video image data to send, adapting the rate setting delivered by the server on the basis of at least the result of the comparing step, compressing said set of video image data to send using a compression mode which depends on the adapted rate setting, sending said set of video image data so compressed.

This method makes it possible to have a compression rate which varies gently, which provides good reproduction for the human eye. This is obtained by virtue of the adaptation of the rate setting on the basis of the comparison between the scheduled time for the data and the speed of variation which would be obtained for a candidate rate setting (possible rate setting).

According to an advantageous feature, depending on the result of the comparing step, the compression mode is either adapted on the basis of an average of values for the adapted rate setting taken during a period of time of order of magnitude equal to the scheduled time Ev, or is adapted on the basis of an instantaneous value of said rate setting.

Thus, the rate setting value taken into account for the compression is adapted to the constraints of use of the client.

According to another advantageous feature, the scheduled time $E_v$ depends on a frame rate of the images of the data stream.

Such a scheduled time value is easy to obtain. Furthermore, this feature makes it possible to avoid having a buffer memory of large size on the server.

According to another advantageous feature, the scheduled time $E_v$ depends on temporal constraints of use of the client device.

This makes it possible to precisely take into account the real scheduled times linked to the use of the data by the client device, and to provide a better use of the resources thereof.

According to an advantageous implementation, depending on the result of the comparing step, the adapted rate setting is either a considered setting, or an alternative setting.

This feature provides greater flexibility in the choice of adaptation of the network rate setting.

According to another advantageous feature, the alternative rate setting is the TFRC function.

The TFRC function is standardized, for example in the DCCP protocol (IETF RFC 4342), and is thus available on numerous systems. It provides the advantage of having an equitable behavior relative to TCP streams (controlled by a setting of AIMD type) and to provide a slower speed of setting variation than AIMD.

According to an alternative which is also advantageous, the alternative rate setting is a smoothed GAIMD function.

This enables transmission of the video image data stream over the network on which other data streams are simultaneously transmitted with the AIMD function, the transmission being ensured with a requested bandwidth which is equal to that of a data stream sent in competition with the AIMD function.

Thus, the alternative setting (whether it be TFRC or a smoothed GAIMD) has an equitable behavior relative to other streams present on the network, the majority of which are AIMD streams. Moreover, the sizes of the successive images vary gently, which gives gentle variations in quality and thus overall a good reproduction for the video.

The GAIMD algorithm provides the advantage of having a behavior that is easy to analyze, an implementation very close to that of the AIMD algorithm which does not therefore necessitate much development (no creation of new messages in particular, nor any modification relative to the client device). Lastly, the GAIMD algorithm makes it possible to have several different settings with varied behaviors: it is possible in particular to have different speeds of variations of settings adapted to different characteristics of the traffic over the network.

According to an advantageous feature, the rate setting considered is the AIMD setting.

As the AIMD algorithm is a common setting in IP networks, it is thus easy to implement, in particular when competing streams are present on the network.

According to a second general definition, the invention also consists of a device for sending a video image data stream between a server and at least one client device in a communication network, employing a rate setting for the transmission of data over the communication network, the device comprising means for:

obtaining an item of information $P_c$ representing a speed of variation over time for a possible rate setting, said, item of information depending on at least one characteristic of the state of the traffic over the communication network, comparing said item of information $P_c$ so obtained with a scheduled time $E_v$ for a set of video image data to send, adapting the rate setting delivered by the server on the basis of at least the result of the comparing step, compressing said set of video image data to send using a compression mode which depends on the adapted rate setting, sending said set of video image data so compressed.

The features relative to the method according to the invention which have been presented above also apply to the device so defined. This is also the case for the aforementioned advantages.

According to a third general definition of the invention, the invention consists of a computer program comprising a set of instructions which, when they are executed by a microprocessor, are adapted to implement a method according to the invention.

The features relative to the method according to the invention which have been presented above also apply to the computer program so defined. This is also the case for the aforementioned advantages.

The invention will now be presented in detail, with reference to the accompanying drawings, of which FIG. 1 is a diagram of a data communication network, in the context of which the present invention may be implemented;

Figure 1:
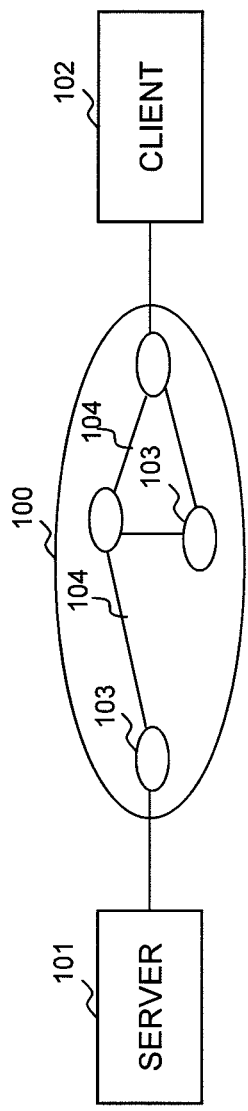

FIG. 1 shows a data communication network example in which the present invention may be implemented. A sending device or server 101 transmits data packets of a data stream to a receiving device or client device 102 across a communication network 100.

The network 100 may contain interconnection nodes 103 (also termed routers) and links 104 which create paths between the sending and receiving devices. The same network may be used by numerous server and client devices implementing the invention or not.

The interconnection nodes 103 receive the packets, temporarily store them in a local memory then re-transmit them as soon as possible over an output link. The interconnection nodes 103 and the receiving device 102 may reject data packets in case of congestion, that is to say in case of overflow of the reception memory.

The network 100 may be for example a wireless network of WiFi (802.11a, b or g), type, or an Ethernet network, or, like the Internet, it may be composed of links of different types.

The sending device 101 may be any type of data processing device able to compress and send a stream of compressed data to a receiving device. By way of example that is in no way limiting, the sending device 101 may be a stream server capable of supplying a content to clients on demand, for example using the RTP protocol (Real-time Transport Protocol), UDP (User Datagram Protocol) or DCCP (Datagram Congestion Control Protocol) or any other type of communication protocol.

The sending device 101 may implement a congestion control algorithm of the type mentioned above, i.e. TFRC or AIMD.

Figure 2:
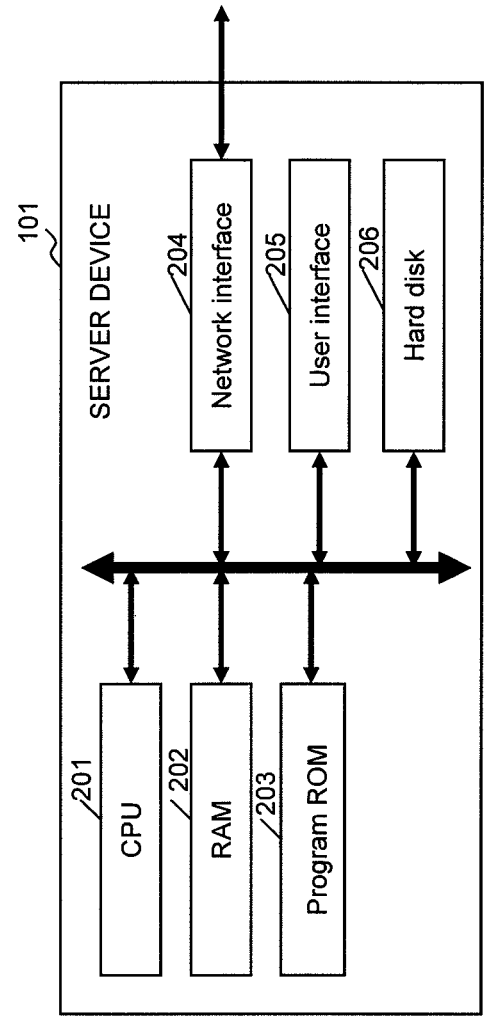
FIG. 2 represents an architecture for a sending device to which the invention may be applied.

FIG. 2 illustrates an example of a sending device 101 adapted to incorporate the invention, in a particular embodiment.

Preferably, the sending device 101 comprises a central processing unit (CPU) 201 capable of executing computer program instructions coming from a read only memory (ROM) 203 on powering up of the sending device, as well as instructions concerning a software application coming from a main memory 202 after powering up.

The main memory 202 is for example of random access memory (RAM) type and operates as a working zone of the CPU 201. The memory capacity of the RAM 202 may be increased by an optional RAM connected to an extension port (not illustrated).

The instructions concerning the software application may be loaded into the main memory 202 from a hard disk 206 or else from the program ROM 203 for example.

Generally, a means for storing information which may be read by a computer or by a microprocessor, is adapted to store one or more programs of which the execution enables the implementation of the method according to the invention.

This storage means is integrated into the device 101 or not, and may possibly be removable. The execution of the program or programs mentioned above may take place, for example, when the information stored in the storage means are read by the computer or by the microprocessor.

When the software application is executed by the CPU 201, it leads to the execution of the steps of the method according to the invention.

The sending device 101 further comprises a network interface 204 which enables its connection to the communication network 100.

When the software application is executed by the CPU 201, it is adapted to react to packets coming from other devices 102, received by means of the network interface 204 and to supply packets to other devices 102 via the network 100.

The sending device 101 may further comprise a user interface 205, comprising for example a screen, a keyboard or a pointing device such as a mouse or an optical stylus, to display information for a user or to receive inputs from the user. This interface is optional.

A sending device 101 is for example a micro-computer, a workstation, a digital assistant, a portable telephone, a digital camcorder, a digital photographic camera, a video surveillance camera (for example of webcam type), a DVD reader, a multimedia server or a router element in a network.

This sending device 101 may include a digital image sensor, or be connected to different peripherals such as a digital video camera, a scanner or any means for image acquisition or storage connected to a graphics card and supplying the apparatus with multimedia data. The sending device 101 may also have access to multimedia data on a storage medium (for example the hard disk 206) or may receive a multimedia stream to process, for example coming from a network.

Figure 3:
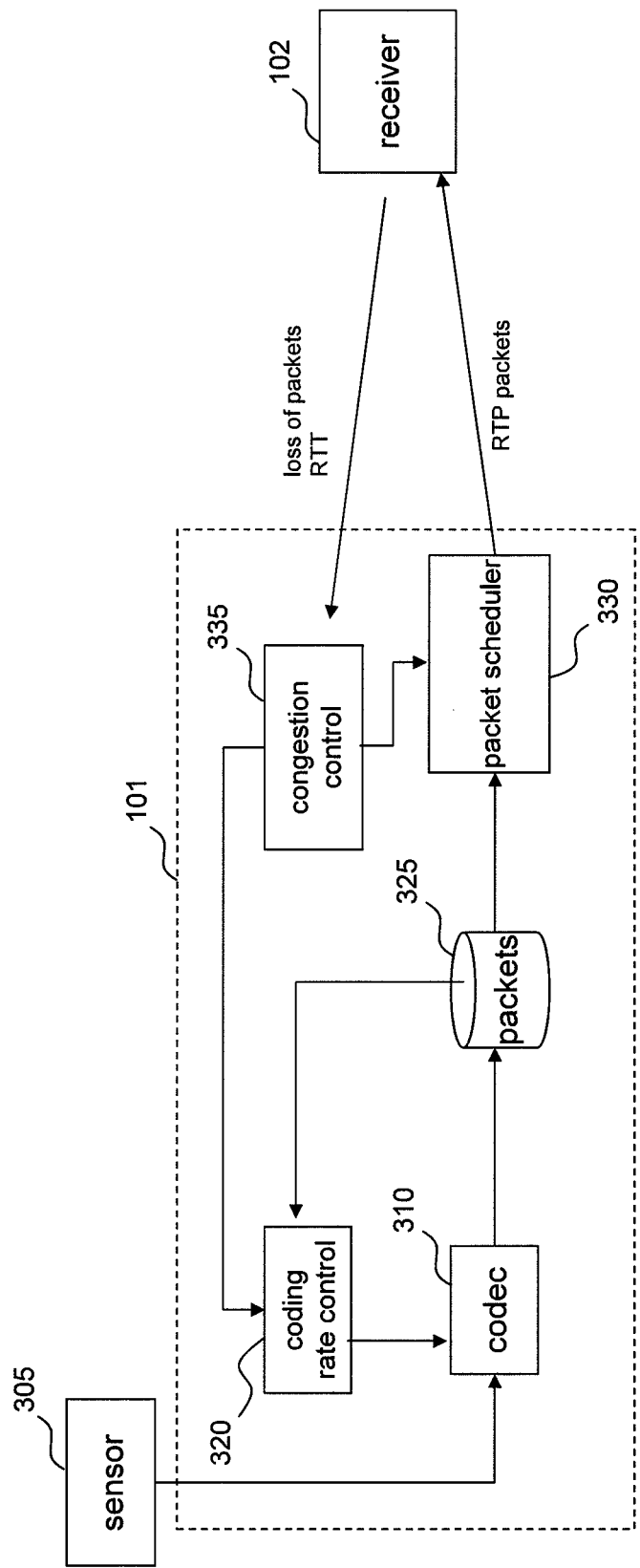
FIG. 3 represents the functional modules of a sending device according to one embodiment of the invention.

With reference to FIG. 3, the server 101 has video data as input from a source, for example coming from a sensor, which may be a video camera 305, or a disk drive.

The video data are supplied to a video coder or codec (coding-decoding module) 310 which codes or compresses the video in a known format (for example H264) before storing the result in a buffer memory 325 in the form of packets ready to be sent. The operation of the buffer memory 325 will be described in more detail with reference to FIG. 6.

According to a variant embodiment, video data already compressed are received from another network. A home gateway may for example be used receiving a television channel by Internet. In this case, the codec enables the video to be transcoded to adapt is rate to the bandwidth of the home network which may be a wireless network. As in the first case, the data created are stored in the buffer memory 325.

The video coder 310 is controlled by a video coding rate control module 320. This determines operating parameters for the coder 310, in particular the quantity and the type of data to produce. For this, it uses network rate setting information delivered by a congestion control module 335, as well as the number of packets waiting in the buffer memory 325. The operation of the video coding rate control module 320 will be described in more detail with reference to FIG. 4.

The packets stored in the buffer memory 325 are read and sent over the network by the packet scheduler module 330 given the task of sending the packets.

The packet scheduler algorithm 330 decides on the times at which the packets are sent (scheduled times) on the basis of the instantaneous rate setting delivered by the algorithm of the congestion control module 335. For this, the packet scheduler 330 is repeatedly activated, either by the scheduler 330 or by a clock (not shown, but present in the server 101).

The scheduler may also activate itself, by virtue of an active standby algorithm.

According to a variant, the scheduler is triggered on reception of network packets coming from the receiving device 102 (this method is commonly used), or at the time of another triggering event.

When it is activated, the scheduler 330 uses the instantaneous network rate setting calculated by the congestion control module 335 to calculate the number of packets to send in order for the setting to be complied with. Next, the scheduler 330 sends a number of packets as calculated, over the network.

The algorithm of the congestion control module 335 estimates the rate available over the network 100. To perform this calculation, the module 335 uses the information received from the client 102 across the network 100. This is, in particular, information on packet loss occurrence and on the value of round-trip communication times on the network from the receiver 102 to the sender 101 (RTT).

This information is determined by the receiver 102 and sent conventionally using RTCP ("Real-time Transport Control Protocol") messages of the RTP protocol. The congestion control module algorithm 335 will be presented in detail with reference to FIG. 5.

Figure 4:
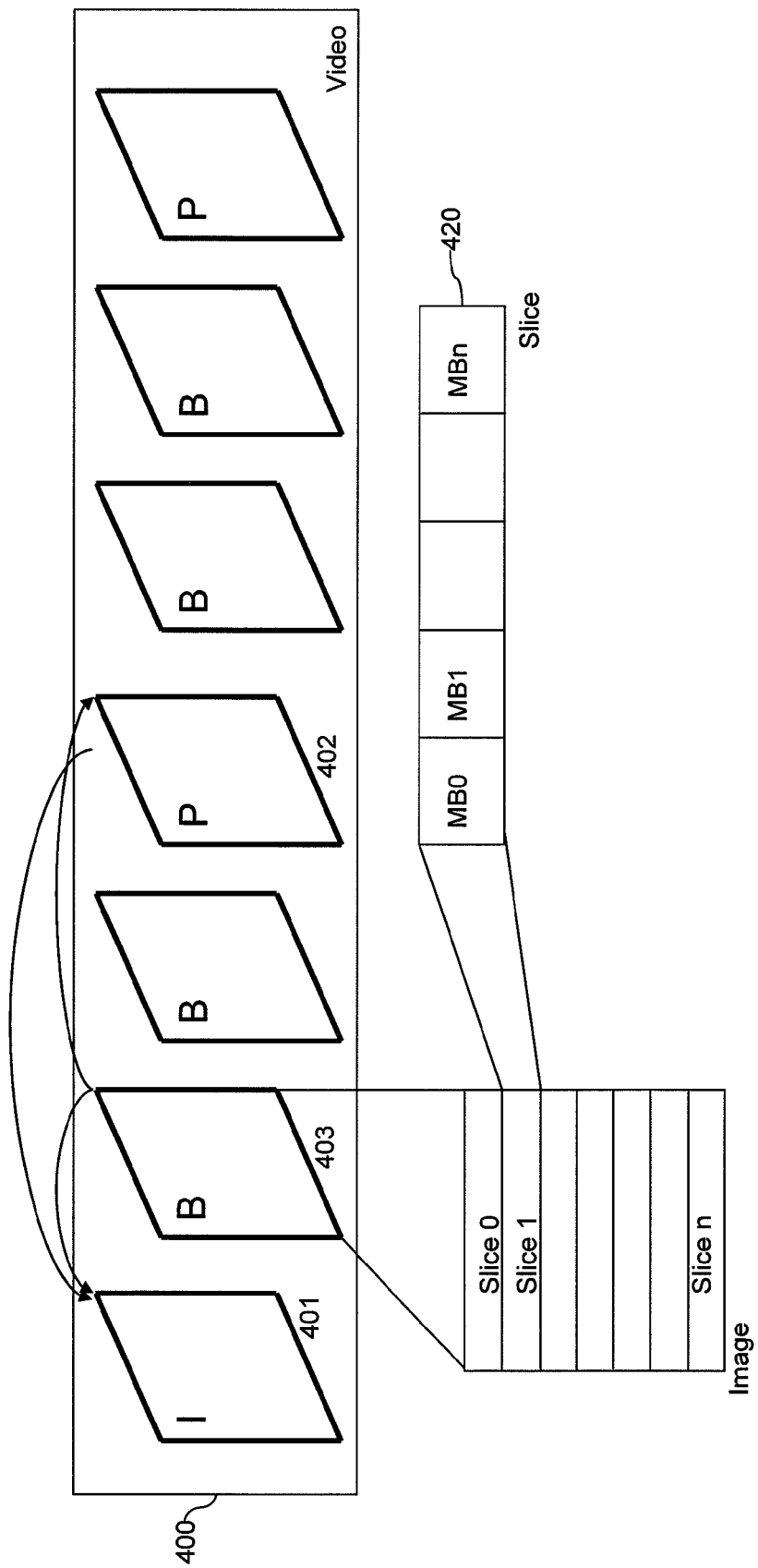
FIG. 4 represents a sequence of images coded using a type of video coding to which the invention may be applied.

FIG. 4 is a diagrammatic representation of a sequence of images that are compressed with a video compression format such as H.264 or MPEG-4. These are formats based on the application of a transformation by blocks of the video sequence (for example a Discrete Cosine Transformation, referred to as DCT, in the case of the MPEG4 part 2 format), to the motion compensation and to a quantization.

Conventionally, a sequence 400 coded using such a format contains images of I type (or INTRA images) 401, which are decodable independently of the other images of the sequence, and images of Inter type which are decodable using one or more neighboring images. Among the Inter images, are images of P type (or predicted images) 402 and images of B type (or bi-predicted images) 403.

Groups of images (or "groups of pictures", GOPs) are defined that are constituted by one I type image followed by a predetermined number of P and B type images.

The size of the I, P and B type images is very variable. Generally, the I type images are less compressed since their compression does not use motion compensation. The P type images are better compressed than the I images and the images of B type are the most compressed.

The images are compressed by macroblocks, which are blocks of 16×16 pixels grouped into slices 420. In the case of sending a video over a network, each slice 420 is placed in one or more RTP packets and sent over the network to a receiver.

Several parameters may be modified by the video coding rate control module 320 to modulate the compression rate of a video.

For example, the quantization step size may be modified, for each intra and inter block. Some images may also be deleted, which indicates a change in display frequency. The structure of the GOP is thus modified.

The compression rate obtained for a set of parameters is not fixed since the result of the compression depends on the type of image and video and on the content of the scene. In particular, the compression rate depends on the quantity of non-redundant information present in the original sequence.

For example, a film with a static scene or a small object in regular translational motion may be strongly compressed, but not an action film which contains a high quantity of non-redundant data.

The techniques described may be applied at the time of a coding or transcoding operation of a video.

In the case of coding, a digital sensor (such as the sensor 305 of FIG. 3) generates images which are then coded. At the start of a group of images GOP, an I image is generated, then the following images are compressed in P or B mode according to the structure of the GOP.

In the case of transcoding, the video represented has already been coded beforehand but its compression rate must be modified to lower the rate of the sequence.

Other techniques for bandwidth compression and adaptation may be used. For example, certain forms of coding make it possible to have coding over several levels (scalable video coding). The video is then composed of several layers. Each layer adds additional information and thus more rate, consequently improving the quality of the final visual reproduction. The adaptation of the rate then consists of selecting the number of layers desired.

The video coding rate control module 320 first of all calculates the size of the next image, to comply with the network rate objectives (setting) fixed by the congestion control module 335, and to avoid making the output buffer memory 325 overflow.

Let T denote the quantity of data in the buffer memory 325, C the setting received from the congestion control, $E_V$ the maximum length of time before sending the data of the next image, and M the maximum size of the next image, the latter being expressed in the following form $M=CE_V-T$.

The algorithm of the video coding rate control module 320 next calculates the compression parameters optimized to comply with the size so calculated while maximizing the quality of the final reproduction of the video. A conventional technique consists of using a rate-distortion module. By way of example, known models used in the context of MPEG compression are TMN-5 or TMN-8.

The video coding rate control module 320 is regularly invoked to calculate the compression modes and the quantization step sizes for each image and each macroblock.

According to the type of codec 310 used, the algorithm of the module 320 may be applied for each image, each macroblock or once per GOP. Let $F_V$ be the frequency at which the algorithm of the video coding rate control module 320 is activated and takes into account the network rate setting calculated by the congestion control module 325. For example, in the case of a video with 50 frames per second, if the video coding rate control algorithm is executed at each new compressed image, it will be executed every 20 ms, that is to say at a frequency $F_v$ of 50 Hz.

Conventionally, the video coding rate control module 320 is activated at each image. It then takes into account the network rate setting to calculate the size and the type of the following image.

Next, each macroblock is compressed by the codec 310. The quantization step size for each macroblock is next evaluated on the basis of the sizes of the macroblocks compressed previously to attain the target size and on the basis of the rate-distortion model. The model is itself updated on the basis of the results of compressions of the macroblocks.

The method presented is also applicable when the rate control algorithm is executed for each macroblock or each slice.

Figure 5:
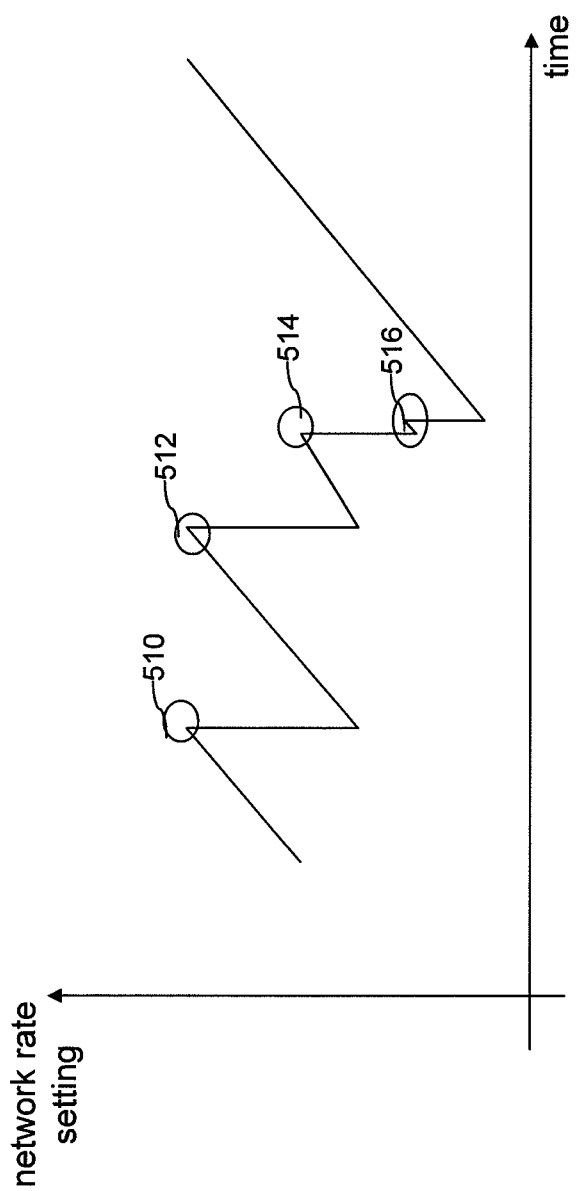
FIG. 5 represents a variation over time of the setting given by a congestion control module to a packet scheduler module.

With reference to FIG. 5, the algorithm of the congestion control module 335 calculates the quantity of data to send over the network by the packet scheduler module 330. The value of rate so calculated by the congestion control module 335 is the network rate setting presented earlier in FIG. 3. This setting is represented along the y-axis (in number of packets per sending operation) against the time represented along the x-axis.

The number of packets to send is adapted to the state of congestion of the network. If the network is congested, the sending of the packets is smoothed over time.

The most widely known algorithm for the congestion control module 335 is that of TCP which is of AIMD ("Additive Increase Multiplicative Decrease") type.

This algorithm calculates the number of packets to send during a round trip time (RTT), termed window W, and progressively increases it so long as the client 102 signals that the packets are properly received.

On average the AIMD algorithm commands the sending of one additional data packet each time acknowledgment of satisfactory round trip is received, which causes a linear increase in W.

When the congestion control module finds that a packet loss has occurred on the network, this means that the network is congested. In reaction, the size of the window W is divided by 2, that is to say that half as many packets will henceforth be sent during one RTT. This gives rise to a reduction by a factor of 2 in the rate of packets sent by the packet scheduler module 330.

When there are no losses on the network 100, the rate setting increases linearly with time. On the contrary, the loss events 510, 512, 514, 516 cause a drop in the rate requested by the packet scheduler module 330. Sometimes several loss events may occur very close together such as 514, 516 and thus a fast and large drop occurs in the requested rate.

Due to the sending time from the server device to the client device, and the time for receiving the acknowledgement of proper receipt from the client device to the server device, the AIMD algorithm has a behavior which is linked to the round trip time (RTT) of the network.

In a local network or over a short distance, the RTT value may be of the order of 0.1 millisecond. There may thus be rapid variations in the network rate relative to the speed of the coder 310, which may be one image every 20 ms (frame rate of the images in the data stream).

Like the AIMD algorithm, an algorithm of TFRC ("TCP Friendly Rate Control") type operates by using the packet loss events, as well as a calculation of RTT. It calculates the rate setting by using an equation which must give a rate comparable to that of the TCP algorithm with an equivalent RTT, but with variations that are smoothed more. The decreases and increases are less rapid than those of the AIMD algorithm but, faced with the same conditions as AIMD, the TFRC algorithm uses on average the same fraction of the bandwidth. In the case of the TFRC algorithm, the congestion control module 335 is located with the client device 102. The calculation of the available rate is thus carried out by the client who thus sends the evaluated rate setting to the server 101.

In both cases, the congestion control module 335 uses information linked to the loss events as well as the round trip time (RTT) on the network. Using this information, it calculates an estimated value for available network rate. It may thus inform the packet scheduler module 330 of an estimation for the rate available over the network for the transmission of data over the network.

The estimated available rate value (network rate setting) is also supplied to the video coding rate control module 320 in order for the latter to be able to use it to control the size of the following images compressed by the coder 310.

There are numerous congestion control algorithms. The embodiment described here uses the GAIMD ("Generalized Additive Increase Multiplicative Decrease") algorithm. However, the invention is applicable to any other congestion control algorithm.

The GAIMD(a,b) algorithm, that is to say GAIMD using the parameters a and b which are dimensionless positive numerical values, is a generalization of the AIMD algorithm. The size of the window W is evaluated each time there is acknowledgement from the client 102 of receipt of the packets. The rate setting for sending data is consequently also reevaluated correspondingly often.

At each period of error-free round trip time, the rate setting is increased by a number of packets equal to a. In case of error, the rate setting is multiplied by (1−b). It will be noted that b is between 0 and 1 and that the multiplication of the rate by (1−b) amounts to reducing the rate.

It will furthermore be noted that the GAIMD algorithm with the parameter values a=1 and b=0.5 corresponds to the AIMD algorithm. However, other values may be chosen. For example, GAIMD(0.3125; 0.13) has desirable properties: it has variations that are smoothed relative to the AIMD algorithm, and it enables equitable sharing of bandwidth, which enables it to be sent over a network concurrently with AIMD. It is thus an alternative to the TFRC algorithm.

Figure 7:
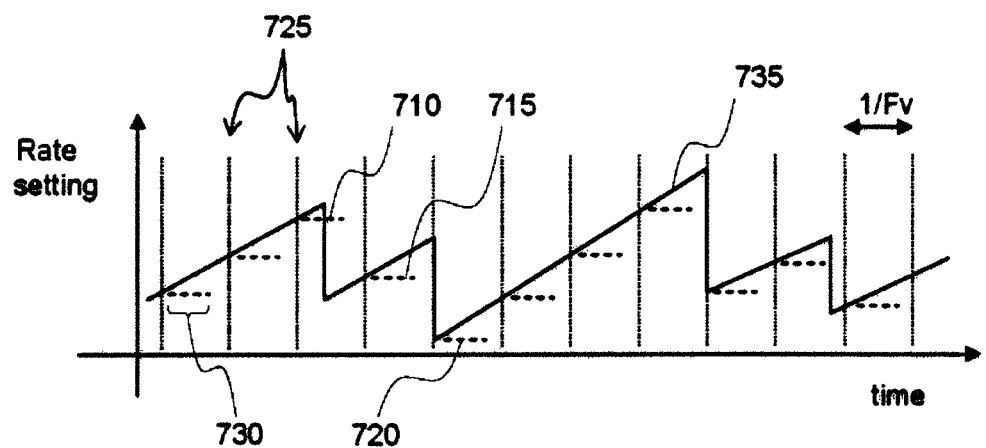
FIG. 7 represents compression of successive images in the presence of a rate requested by a congestion control module in a first situation according to the prior art.

FIG. 7 illustrates, like FIG. 5, image compression controlled by the video coding rate control module 320 in accordance with the indications from a congestion control module 335 which makes the network rate setting 735 rapidly vary with time (for example AIMD). Thus, drops in the network rate setting occur, for example, at a rhythm which is between ¼ and 1 times the rhythm of sending the images.

The coder 310 takes the new video coding rate setting into account at regular intervals (of length of time equal to $1/F_v$) at the times 725, each of these times coinciding with an image to code for example. Each image is sent before the following image to code. The sending time is represented by way of illustration using the reference 730.

Such image compression has two drawbacks.

First of all, the rate available for sending the following image is difficult to predict. If the video coding rate control module 320 is based on the current value of the network rate setting calculated by the congestion control module 335, it risks creating images that are too voluminous in certain cases. Thus they may not be sent in time. This is the case of the image 710 which is compressed just before the network rate is strongly reduced and sent in part after that reduction in network rate. In other cases, the images created may be too small given the available network rate. This is the case for example for the image 720.

Subsequently, the video is of poor quality, since the human eye is sensitive to the variations in resolution of the images in a video. For example, the abrupt drop in the sizes of the images 710, 715 and 720 gives a poor visual quality. Abrupt variations in size from one image to another are to be avoided as much as possible.

It is to be noted that the drawing here is simplified in order not to make the disclosure over-complicated. The time 730 for sending each image is artificially represented as being constant. However, as explained with reference to FIG. 6 below, the real sending time is variable according to the network rate and the content of the buffer memory. However, the time 725 at which the coder 310 takes into account the video coding rate setting supplied by the video coding rate control module 320 are indeed periodical as illustrated in the drawing.

Figure 8:
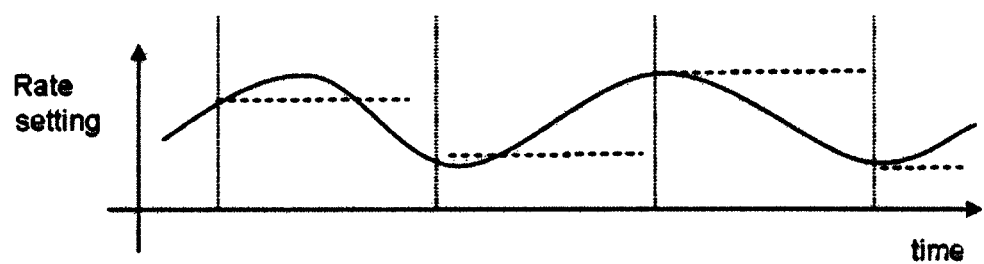
FIG. 8 represents compression of successive images in the presence of a rate requested by a congestion control module in a second situation according to the prior art.

FIG. 8 shows another implementation during which the network rate setting (supplied by the congestion control module 335 and represented along the y-axis) varies slowly but the rhythm of the variations is of the same order of magnitude as the rate of taking into account by the image coder 310 of the video coding rate setting supplied by the video coding rate control module 320. In this case, the variations in network rate are of low predictability and the changes in size from one image to another are very great. In this case the quality for the video is also low.

To mitigate the above drawbacks, it is thus important for the speed of variation of the network rate setting, and thus the choice of a congestion control algorithm delivering settings that are more or less smoothed, to be taken into account to ensure that the data are sent in time, while avoiding an abrupt variation in the quality.

Figure 9:
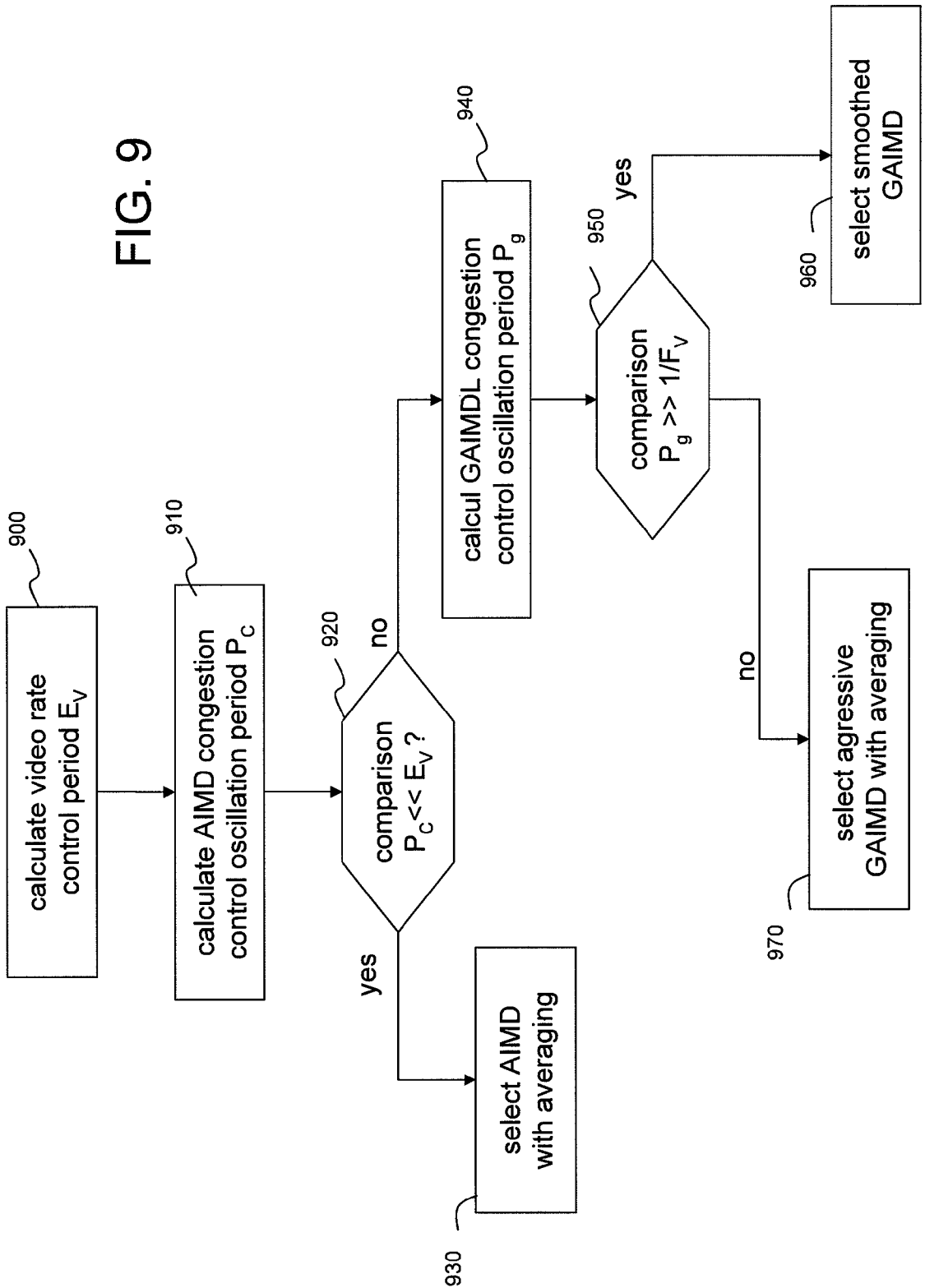
FIG. 9 represents an algorithm for choosing a congestion control module algorithm according to an embodiment of the invention.

FIG. 9 represents an algorithm according to one embodiment of the invention. It makes it possible to determine the most appropriate congestion control algorithm enabling the video coding rate to be adapted to the network rate actually available on sending the coded data (compressed images).

This determining/selecting algorithm is executed by the server device 101, at the start of sending a stream, for example, when the request for a new stream is received. It may also be executed again during transmission to check whether the selected congestion control algorithm is still adapted to the conditions which have varied (for example, the state of the traffic over the network) or whether it must be modified.

First of all, the first step 900 of the algorithm is a step of determining the maximum length of time the server has available to send the data generated from the moment they were sent to it by the data source such as the sensor 305 or a disk drive. This maximum length of time (time of validity for a set of data) is denoted E. It enables determination, as of the moment of sending of the data by the source, of the scheduled time for the set of data of the video, that is to say the latest instant at which those data can be sent.

In a first embodiment, the length of time $E_V$ is chosen as equal to the period between two images of the video. In this first embodiment, the frequency $F_V$ is taken as equal to the frequency of reception of the images, that is to say that the video coding rate control module 320 takes into account a new value of network rate setting at each image. Therefore in this case $E_V=1/F_V$.

This choice is advantageous since $F_V$ is an item of data easy to obtain and the implementation is made, in this case, without having need for a buffer memory 325 of too large a size.

In a second embodiment, the latest possible time of sending the images that is acceptable to the client is used as scheduled time. The maximum length of time the server has to send the data is in this case denoted $P_V$. Thus $E_V=P_V$.

This choice is advantageous, in that it enables the real scheduled times linked to the data and to their use by the client to be taken into account. It enables better use of the client's resources.

Figure 6:
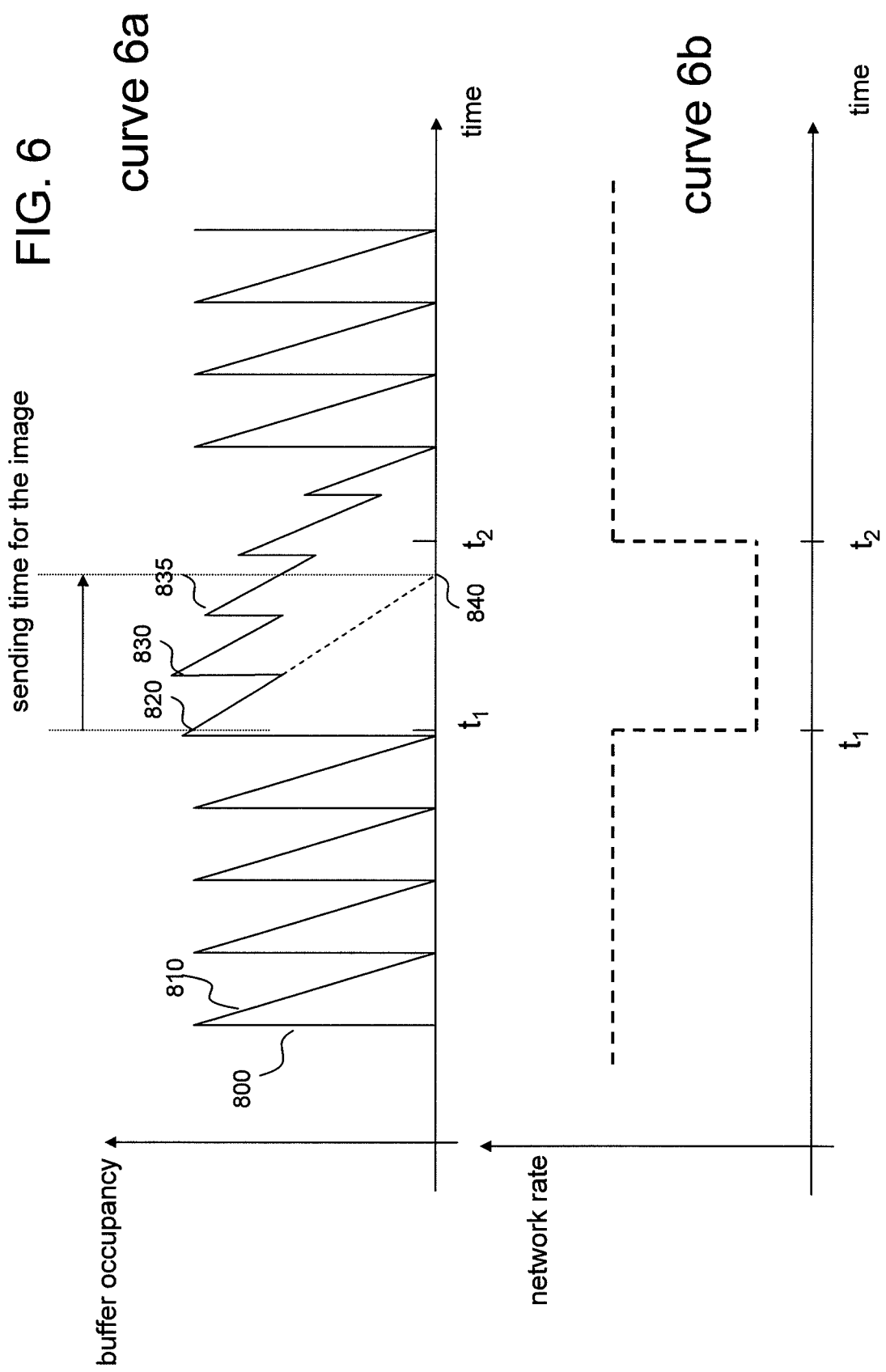
FIG. 6 represents the level of filling of the sending buffer memory of a sending device such as that of FIG. 2 over time, while the rate requested by the congestion control module varies.

FIG. 6 gives an example of calculation of the length of time $P_V$ referred to above. On curve 6a in that drawing, the variations of the level of filing of the buffer memory 325 (along the y-axis) have been represented against time (represented along the x-axis), in response to a variation of the network rate setting (in number of packets per sending operation) calculated by the congestion control module 335. This variation in the rate with time is represented on curve 6b.

If the rate of the network is fixed, the buffer memory 325 fill at each creation of a compressed image, then empties according to the rhythm of sending of the packets over the network. Ideally, the buffer memory 325 is empty at the moment at which the compression module 310 communicates a compressed image to it which is introduced entirely. The memory then empties slowly and comes to be empty before, or at latest, at the moment at which a new compressed image is introduced.

If the network rate setting drops abruptly, the buffer memory 325 empties more slowly during one phase, which in the drawing is represented between the times $t_1$ (mark 820) and $t_2$. It is not entirely empty at the time 830 of arrival of the following image.

However, the video coding rate control module 320 reacts to reduce the size of the following images. The sizes of the images arriving at the times 830 and 835 are more reliable than the size of the images which arrive before the time $t_1$ (820). These new adapted sizes enable the buffer memory 325 to empty progressively.

The image that arrived at the time $t_1$ (820) continues to be sent after the images 830 and 835 have been produced. It is only entirely sent at the time 840. Depending on the application, the delay acquired by this image may be entirely acceptable.

The impact of this delay depends on the maximum time for reception of the image that is acceptable by the client device 102. If the client device is in course of displaying the video, the time limit for reception by the client is equal to the time at which the image is displayed. By way of indication, a typical value for the length of time between the time limit for reception by the client and the time at which an image is produced in the case of a video conference is 125 ms.

The sending time length limit $P_V$ for an image must take into account the transfer time in the network. The length of time $P_V$ is equal to the maximum time for reception by the client from which is subtracted the transfer time. For example, in the case of a video conference (maximum delay 125 ms) and a network with a round trip time of 10 ms (RTT=10 ms) it may be estimated that the transfer time is equal to half the RTT (5 ms) and thus that $P_V=120$ ms. In the case of a more reliable RTT, the impact of the network transfer time is rapidly negligible but it may be high for values of RTT greater than 10 ms.

The sending time limit may be calculated from information provided by the client in the RTCP messages: time at which the images are displayed and network transfer time.

On account of the buffer memory 325 that serves for the sending of the images and on account of the scheduled time for the images (this scheduled time may be longer than the inter image time), the size prediction for an image must be based on a prediction or estimation of average rate over the maximum sending time length for the images.

Returning to FIG. 9, the following step 910 consists of obtaining, for example by calculation, an item of information representing a speed of variation over time for a possible rate setting (value representing the rhythm of oscillation of the congestion control 335) at the time at which the selecting algorithm is implemented, denoted time t. This value, which is thus an instantaneous value, is calculated using the method illustrated in FIG. 10.

Figure 10:
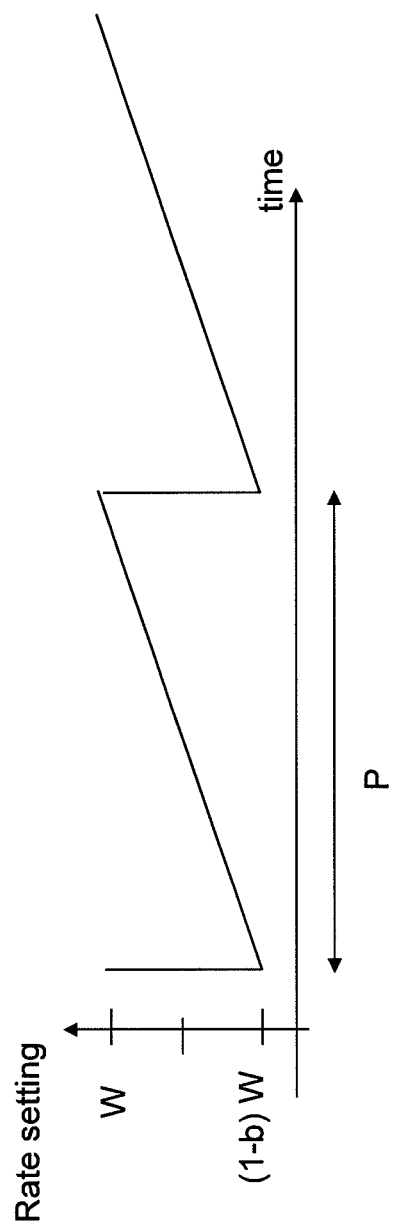
FIG. 10 represents the simulation of a setting given by a congestion control module to a packet scheduler module, made at a given time, during implementation of an embodiment of the invention.

With reference to FIG. 10, a pseudo-period P is calculated for a possible rate setting under consideration, which may be the setting delivered by the congestion control module currently selected (referred to as actual setting) represented in FIG. 5, or a candidate setting which it is envisaged to obtain by selecting a different congestion control algorithm, in particular a reference algorithm, like AIMD.

FIG. 10 represents a simulated curve for data rate against time (as in FIG. 5). The simulation is carried out taking into account at least one instantaneous characteristic of the real state of the traffic on the network taken at the time t.

This simulated curve represents a rate setting considered of the type obtained by a GAIMD algorithm with parameters a and b, and generating an average rate $B_m$ identical to that generated by the actual setting at the time t. The value of $B_m$ is calculated on the basis of the values taken by the actual rate setting during a recent elapsed period (which may be of a few seconds). Step 910 takes (a, b)=(1, 0.5).

The simulation of this curve is made with the hypothesis (or constraint) that the sate of the traffic on the network (occurrence of the loss events and round trip times) leads the GAIMD(a; b) algorithm to issue a periodic rate command of period P and average $B_m$. This hypothesis is not in general verified, as can be seen in FIG. 5. It is for this reason that the calculated value P is qualified as pseudo-period.

The simulation may also be made by taking into account the round trip time R between the client and the server at the time t and the size S of the packets at that same time.

A calculating method implemented in a preferred embodiment is the one used in the document S. Floyd at al. referred to above.

The round trip number from the server to the client during the period P is designated N, and P=N*R, where R designates the round trip time RTT.

The maximum value of the window size attained before an error occurs and the rate drops is designated W. As already mentioned, the window after error is equal to (1−b)W.

During a period P a number N of round trips of length of time R take place, and the window increases by a packets at each round trip, so giving the following equalities:

$(1-b)W + Na = W$, hence $N = bW/a$.

Consequently, the pseudo period may be expressed as P=bWR/a.

Furthermore, the average size of the window $W_m$ (in number of packets to send per RTT period) takes the form $$W_m = \frac{W + (1-b)W}{2} = \frac{(2-b)W}{2}.$$

The average rate (in bit/s) is thus $$B_m = W_m * \frac{S}{R} = \frac{(2-b)WS}{2R},$$

which enables W to be eliminated from the calculation of the pseudo-period, and the following formula is obtained $$P = \frac{2bBR^2}{(2-b)aS}.$$

For the applications to which the invention is directed, the values of bandwidth $B_m$ may typically vary between 1 Mbit/s and 100 Mbit/s, and the RTT values may vary between 0.1 ms and 100 ms.

The following table gives the resulting values of P (in seconds) for the GAIMD(1; 0.5) function for a conventional size of packet S of 12000 bits.

| | $B_m$ (bit/s) | | | | | |
|---|---|---|---|---|---|---|
| RTT (s) | 1 000 000 | 5 000 000 | 10 000 000 | 20 000 000 | 50 000 000 | 100 000 000 |
| 0.0001 | 5.556E−07 | 2.77778E−06 | 5.55556E−06 | 1.11111E−05 | 2.77778E−05 | 5.55556E−05 |
| 0.001 | 5.556E−05 | 0.000277778 | 0.000555556 | 0.001111111 | 0.002777778 | 0.005555556 |
| 0.002 | 0.0002222 | 0.001111111 | 0.002222222 | 0.004444444 | 0.011111111 | 0.022222222 |
| 0.01 | 0.0055556 | 0.027777778 | 0.055555556 | 0.111111111 | 0.277777778 | 0.555555556 |
| 0.1 | 0.5555556 | 2.777777778 | 5.555555556 | 11.11111111 | 27.77777778 | 55.55555556 |

It is thus found that the pseudo-period varies between 0.55 microseconds (value obtained for $B_m$=1 000 000 bit/s and RTT=0.1 ms) and 55 seconds (value obtained for $B_m$=100 000 000 bit/s and RTT=0.1 s).

The pseudo-period is a good indicator of the speed at which the congestion control reacts and modifies the instantaneous network rate setting.

Returning to step 910 of FIG. 9, the formula obtained in relation to FIG. 10 makes it possible to obtain, here by calculation, an item of information which is the pseudo-period $P_c$ of the congestion control algorithm at the time t. The size of the packets S is set at the size required by the network (typically 12 000 bits for an Ethernet network), the value of the round trip time RTT is calculated on the basis of preceding acknowledgements from the client, the rate $B_m$ is calculated as the average rate obtained during a length of time of several oscillations preceding the calculation (for example the average rate over the last second), and the values a and b are the parameters of the GAIMD congestion control algorithm considered (if it is the reference function, then a=1 and b=0.5, that is to say the values corresponding to AIMD).

At the following step 920, the item of information obtained at step 910 (pseudo-period $P_c$) is compared to the length of scheduled time $E_V$ of the set of video data to send, this length of time being determined according to the first or the second mode of implementation.

According to the result of the comparing step 920, the following step 930 provides for adapting the rate setting delivered by the server and, more particularly, by the congestion control module.

If the pseudo-period of the congestion control $P_c$ is appreciably shorter than the scheduled time of the video $E_v$ (for example if it is smaller than $E_v/10$), the AIMD algorithm is selected as congestion control algorithm to provide a rate setting adapted to the conditions (step 930). This algorithm constitutes a reference algorithm, commonly used on IP networks. If the AIMD algorithm was already selected, it is kept.

The fact that the length of time $P_C$ is much shorter than $E_V$ indicates that during the transmission time of an image there is a high probability of the network rate varying very often. By taking the average value of the network rate over the length of time $E_V$ there is thus a high chance of having a more stable value than the instantaneous value of the network rate by application of the central limit theorem.

In a case in which AIMD is selected and in which $E_v$ is equal to 125 ms-RTT/2 (case in which $E_V=P_V$ for a video conference), the following table shows, grayed, the values of $P_c$ less than 120 ms divided by 10, that is to say 12 ms for the RTT values less than 10 ms (see the first three lines of the table), for which AIMD is kept as congestion control algorithm. For a high value of RTT (greater than 10 ms, see last line of the table), $E_V$ decreases rapidly while $P_c$ increases rapidly, and it is not possible to have $P_c \ll E_V$.

The average of the rates thus constitutes a better indicator for forecasting the future rates than the current rate. The sizes of the images thus have a variation which is not too abrupt, which on average makes it possible to maintain a good quality of video.

Returning to stage 920 of FIG. 9, if the pseudo-period of the congestion control $P_c$ is not appreciably shorter than the scheduled time $E_v$, then analysis is made of the pseudo-period $P_g$ which would have the network rate setting delivered by an alternative congestion control algorithm, in the circumstances given (characteristics relative to the traffic over the network). These circumstances are defined by the size of the packets S fixed at the size required by the network, the value of the round trip time RTT calculated from the latest acknowledgements, and the rate $B_m$ calculated as the average rate obtained over a length of time of several oscillations preceding the calculation. The values a and b are the parameters of the alternative congestion control chosen, which is here a smoothed GAIMD algorithm, for example with a=0.3125 and b=0.13 (step 940).

Next $P_g$ is compared with the length of time $1/F_v$ between two images of the video (step 950). If $P_g$ is greatly superior to $1/F_v$ (for example $Pg>8/F_v$), the smoothed congestion control is used to calculate the network rate and the setting to send to the rate control for the video is equal to the instantaneous network rate (step 960). The rate setting delivered by the server is thus adapted on the basis of the result of steps 920,

| RTT(s) | B(bit/s) | | | | | |
|---|---|---|---|---|---|---|
| | 1000000 | 5000000 | 10000000 | 20000000 | 50000000 | 100000000 |
| 0.0001 | 5.556E-07 | 2.77778E-06 | 5.55556E-06 | 1.11111E-05 | 2.7777E-05 | 5.55556E-05 |
| 0.001 | 5.556E-05 | 0.000277778 | 0.000555556 | 0.001111111 | 0.002777778 | 0.005555556 |
| 0.002 | 0.0002222 | 0.001111111 | 0.002222222 | 0.004444444 | 0.011111111 | 0.022222222 |
| 0.01 | 0.0055556 | 0.277777778 | 0.055555556 | 0.111111111 | 0.277777778 | 0.555555556 |
| 0.1 | 0.5555556 | 2.777777778 | 5.555555556 | 11.11111111 | 27.77777778 | 55.55555556 |

In this case, a length of time is used during which the video rate setting is averaged. This enables the video coding rate control module 320 not to use the current value of the network rate setting supplied by the congestion control module 335 but an average value thereof which varies less abruptly. The length of time over which an average is thus taken may be the scheduled time for the video $E_v$.

Figure 11:
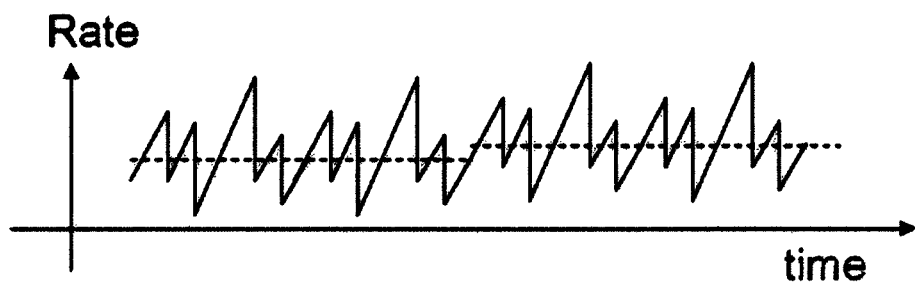
FIG. 11 illustrates compression of successive images in the presence of a rate requested by a congestion control module in a first situation, during implementation of an embodiment of the invention.

A calculated network rate and sizes of compressed images are obtained as represented in FIG. 11.

FIG. 11 illustrates a first implementation using a congestion control which varies less rapidly over time. The drops in rate occur with a faster rhythm that in FIG. 7 and much faster than the rhythm of the images (frame rate).

In this case, the video rate control module 320 does not use the last value of the rate calculated by the congestion control module 335, but an average of the past rates. Thus, the average of the calculated rates has a lower variance than the calculated rates.

940 and 950. It will be noted that the period of oscillation $P_g$ is compared here with the length of time $1/F_v$ since smoothing of the network rate is not used for the calculation of the video rate setting. The fact of having an oscillation period $P_g$ much greater than the rhythm between the images indicates that there are high probabilities of the network rate varying little between two images. The video rate thus remains relatively stable, which gives a good quality.

For example, in the case of GAIMD (0.3125; 0.13) and of $1/F_v$ equal to 20 ms (in the case of a conventional video with 50 images per second with, in addition, an activation of the rate control algorithm at each image), the following table shows in gray the rather high values of $P_g$, that is to say greater than 8 times 20 ms i.e. 160 ms, for which the smoothed congestion control algorithm is chosen.

| RTT(s) | B(bit/s) | | | | | |
|---|---|---|---|---|---|---|
| | 1000000 | 5000000 | 10000000 | 20000000 | 50000000 | 100000000 |
| 0.0001 | 3.708E–07 | 1.85383E–06 | 3.70766E–06 | 7.41533E–06 | 1.85383E–05 | 3.70766E–05 |
| 0.001 | 3.708E–05 | 0.000185383 | 0.000370766 | 0.000741533 | 0.001853832 | 0.003707665 |
| 0.002 | 0.0001483 | 0.000741533 | 0.001483066 | 0.002966132 | 0.00741533 | 0.01483066 |
| 0.01 | 0.0037077 | 0.018538324 | 0.037076649 | 0.074153295 | 0.185383244 | 0.370766488 |
| 0.1 | 0.3707665 | 1.853832442 | 3.707664884 | 7.415329468 | 18.53832442 | 37.07664884 |

The variations in size between images are thus small. A requested rate and sizes of compressed images are obtained as represented in FIG. 12.

Figure 12:
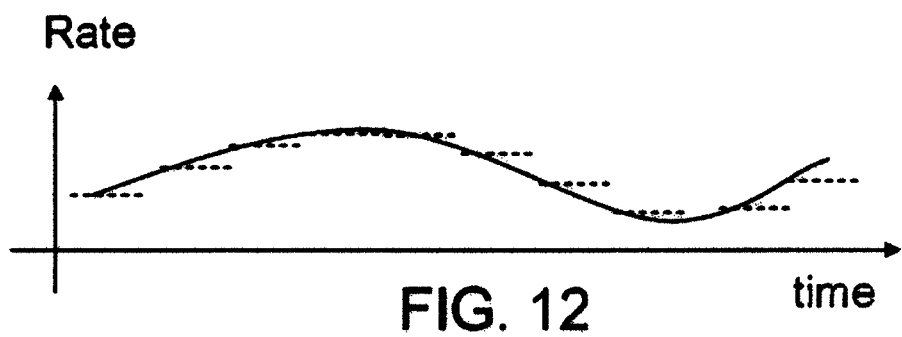
FIG. 12 represents compression of successive images in the presence of a rate requested by a congestion control module in a second situation, during implementation of an embodiment of the invention.

FIG. 12 illustrates a second implementation with this time another case of congestion control algorithm delivering a setting which gently varies over time (for example on the basis of the TFRC algorithm) with a rhythm of variation of the order of several images.

In this case, the available network rate for sending the following image may be predicted with safety and, moreover, the sizes of the successive images vary gently, which provides gentle variations in quality and thus overall a good quality for the video.

This example shows that in certain cases it may be advantageous to have a smoother congestion control than AIMD.

Returning to stage 950 of FIG. 9, if the test is negative, the circumstances are essentially the following: RTT=0.01 s and $B_m$ is between 5 000 000 and 20 000 000 bits/s, or RTT=0.02 s and Bm=100 000 000 bits/s.

In this case, the parameters of the congestion control are modified to select another alternative congestion control algorithm which delivers a setting varying more rapidly (step 970). The network rate setting delivered by the server is thus adapted on the basis of the result of steps 920, 940 and 950.

In one embodiment, GAIMD(4; 0.25) is taken. The following table gives the pseudo-period values for that algorithm in the circumstances given, that is to say again the size of the packets S set to the size required by the network, the value of the round trip time RTT calculated from the latest acknowledgements, the rate $B_m$ calculated as the average rate obtained over a length of time of several oscillations preceding the calculation.

| Rtt(s) | B(bit/s) | | | | | |
|---|---|---|---|---|---|---|
| | 1000000 | 5000000 | 10000000 | 20000000 | 50000000 | 100000000 |
| 0.0001 | 5.952E–08 | 2.97619E–07 | 5.95238E–07 | 1.19048E–06 | 2.97619E–06 | 5.95238E–06 |
| 0.001 | 5.952E–06 | 2.97619E–05 | 5.95238E–05 | 0.000119048 | 0.000297619 | 0.000595238 |
| 0.002 | 2.381E–05 | 0.000119048 | 0.000238095 | 0.00047619 | 0.001190476 | 0.002380952 |
| 0.01 | 0.0005952 | 0.00297619 | 0.005952381 | 0.011904762 | 0.029761905 | 0.05952381 |
| 0.1 | 0.0595238 | 0.297619048 | 0.595238095 | 1.19047619 | 2.976190476 | 5.952380952 |

In the cases in which step 970 is implemented (grayed in the table) a pseudo-period less than 12 ms is obtained and a length of time is used over which an average is taken of the network rate setting. The length of time over which the setting is thus averaged may be the scheduled time $E_v$.

It will be noted that the data to send are compressed using an adapted compression mode which depends on the network rate setting adapted at steps 930, 960 and 970.

The data so compressed are next sent over the network to the client device for use by the latter.

The invention claimed is:

1. A method of sending a data stream of coded video image data from a server to at least one client device via a communication network, wherein the data stream is sent over the communication network under control of a network rate setting calculated by a congestion control module, and wherein a settable coding rate control parameter controls a compression rate of the coded video image data, the method comprising:
   obtaining a period of oscillation for the network rate setting as calculated by the congestion control module, wherein the congestion control module calculates the network rate setting in dependence on at least one characteristic of the state of traffic over the communication network;
   obtaining an activation period for which a specific coding rate control parameter effectuates a corresponding rate of compression of a sequence of video image data;
   determining whether the period of oscillation for the network rate setting is less than the activation period of the coding rate control parameter;
   setting the coding rate control parameter for control of the rate of compression of the coded video image data at least in part on the result of the determining step, wherein in a case where the period of oscillation is determined to be less than the activation period, the coding rate control parameter is set using an average value of the network rate setting averaged over a scheduled time duration for sending of the sequence of video image data;
   compressing a sequence of video image data using a compression mode which depends on the coding rate control parameter so as to obtain a counterpart sequence of coded video image data; and
   sending the coded video image data over the communication network under control of the network rate setting calculated by the congestion control module.

2. A sending method according to claim 1, wherein with respect to the scheduled time duration over which the network rate setting averaged, the scheduled time duration depends on a frame rate of images of the video image data.

3. A sending method according to claim 1, wherein with respect to the scheduled time duration over which the network rate setting averaged, the scheduled time duration depends on temporal constraints of use of the client device.

4. A sending method according to claim 1, wherein the congestion control module controls calculates the network rate setting serving according to an AIMD function.

5. A sending method according to claim 4, further comprising choosing between the AIMD function and an alternative function by which the congestion control module calculates the network rate setting, wherein the choice is based at least in part on the result of the determining step.

6. A sending method according to claim 5, wherein the alternative function is a TFRC function or a smoothed GAIMD function.

7. A sending method according to claim 1, wherein the determining step determines whether the period of oscillation for the network rate setting is much less than the activation period of the coding rate control parameter, and wherein the coding rate control parameter is set using the average value of the network rate setting in a case where period of oscillation is determined to be much less than the activation period.

8. A sending method according to claim 7, wherein in a case where the period of oscillation is determined not to be less than the activation period, the coding rate control parameter is set using a current value of the network rate setting as calculated by the congestion control module.

9. A sending method according to claim 1, wherein the sequence of video image data is selected from the group consisting of a frame of the video image data, multiple frames of the video image data, a macroblock, and a Group of Pictures (GOP).

10. A server for sending a data stream of coded video image data from the server to at least one client device via a communication network, wherein the data stream is sent over the communication network under control of a network rate setting calculated by a congestion control module, and wherein a settable coding rate control parameter controls a compression rate of the coded video image data, the server comprising:
  a network interface to the communication network;
  a microprocessor which executes stored program instructions; and
  a memory which stores program instructions for execution by the microprocessor, such that the microprocessor is configured to:
  obtain a period of oscillation for the network rate setting as calculated by the congestion control module, wherein the congestion control module calculates the network rate setting in dependence on at least one characteristic of the state of traffic over the communication network;
  obtain an activation period for which a specific coding rate control parameter effectuates a corresponding rate of compression of a sequence of video image data;
  determine whether the period of oscillation for the network rate setting is less than the activation period of the coding rate control parameter;
  set the coding rate control parameter for control of the rate of compression of the coded video image data at least in part on the result of the determination, wherein in a case where the period of oscillation is determined to be less than the activation period, the coding rate control parameter is set using an average value of the network rate setting averaged over a scheduled time duration for sending of the sequence of video image data;
  compress a sequence of video image data using a compression mode which depends on the coding rate control parameter so as to obtain a counterpart sequence of coded video image data; and
  send the coded video image data over the communication network through the network interface under control of the network rate setting calculated by the congestion control module.

11. A non-transitory computer-readable storage medium retrievably storing a computer program which, when executed by a microprocessor, implements a method for sending a data stream of coded video image data from a server to at least one client device via a communication network, wherein the data stream is sent over the communication network under control of a network rate setting calculated by a congestion control module, and wherein a settable coding rate control parameter controls a compression rate of the coded video image data, the method comprising:
  obtaining a period of oscillation for the network rate setting as calculated by the congestion control module, wherein the congestion control module calculates the network rate setting in dependence on at least one characteristic of the state of traffic over the communication network;
  obtaining an activation period for which a specific coding rate control parameter effectuates a corresponding rate of compression of a sequence of video image data;
  determining whether the period of oscillation for the network rate setting is less than the activation period of the coding rate control parameter;
  setting the coding rate control parameter for control of the rate of compression of the coded video image data at least in part on the result of the determining step, wherein in a case where the period of oscillation is determined to be less than the activation period, the coding rate control parameter is set using an average value of the network rate setting averaged over a scheduled time duration for sending of the sequence of video image data;
  compressing a sequence of video image data using a compression mode which depends on the coding rate control parameter so as to obtain a counterpart sequence of coded video image data; and
  sending the coded video image data over the communication network under control of the network rate setting calculated by the congestion control module.

* * * * *